United States Patent
Sestigiani

(10) Patent No.: US 12,140,176 B2
(45) Date of Patent: Nov. 12, 2024

(54) METHOD FOR CONNECTING WOODEN CONSTRUCTION PANELS WITH AN INSULATING MATERIAL LAYER

(71) Applicant: Rotho Blaas GmbH/SRL, Cortaccia Bolzano (IT)

(72) Inventor: Luca Sestigiani, Cortaccia sulla strada del vino Bolzano (IT)

(73) Assignee: ROTHO BLAAS GMBH/SHL, Cortaccia Bolzano (IT)

( * ) Notice: Subject to any disclaimer, the term of this patent is extended or adjusted under 35 U.S.C. 154(b) by 0 days.

(21) Appl. No.: 18/249,797

(22) PCT Filed: Oct. 27, 2021

(86) PCT No.: PCT/EP2021/079762
§ 371 (c)(1),
(2) Date: Sep. 21, 2023

(87) PCT Pub. No.: WO2022/090281
PCT Pub. Date: May 5, 2022

(65) Prior Publication Data
US 2024/0200586 A1    Jun. 20, 2024

(30) Foreign Application Priority Data

Oct. 28, 2020  (IT) .................. 102020000025540

(51) Int. Cl.
*E04C 2/284* (2006.01)
*F16B 5/02* (2006.01)
(Continued)

(52) U.S. Cl.
CPC .............. *F16B 5/02* (2013.01); *E04C 2/284* (2013.01); *F16B 15/0046* (2013.01);
(Continued)

(58) Field of Classification Search
CPC .... F16B 5/02; F16B 15/0046; F16B 25/0031; F16B 25/106; F16B 2015/0069; F16B 2015/0076; E04C 2/284
See application file for complete search history.

(56) References Cited

U.S. PATENT DOCUMENTS 2,391,061 A * 12/1945 Mackintosh ........ F16B 15/0053
83/198
3,261,137 A    7/1966 Jureit
(Continued)

OTHER PUBLICATIONS

International Search Report.

*Primary Examiner* — Lee A Holly
(74) *Attorney, Agent, or Firm* — Jacobson Holman PLLC

(57) ABSTRACT

A method for connecting at least two wooden panels for acoustic and/or thermal insulation. In a first step a metal plate or a metal strip with a thickness less than 1.5 mm with teeth, which face the surface of the at least one wooden panel, is arranged in a direction perpendicular to the surface of the metal plate or the metal strip.
An insulating element is attached to the second surface of the wood construction panel with teeth.
A second metal plate or metal strip with a thickness of 1.5 mm or less is attached on the insulating element.
A third element of a wood construction panel is attached on the second surface of the second metal plate or strip with teeth.
Screws are inserted through at least one panel and at least one plate and the screws pierce the metal plate or strip.

8 Claims, 4 Drawing Sheets

(51) Int. Cl.
*F16B 15/00* (2006.01)
*F16B 25/00* (2006.01)
*F16B 25/10* (2006.01)

(52) U.S. Cl.
CPC ........ *F16B 25/0031* (2013.01); *F16B 25/106* (2013.01); *F16B 2015/0069* (2013.01); *F16B 2015/0076* (2013.01)

(56) References Cited

U.S. PATENT DOCUMENTS

| | | | |
|---|---|---|---|
| 3,347,126 A | | 10/1967 | Templin et al. |
| 3,841,194 A | * | 10/1974 | Moehlenpah ....... F16B 15/0046 411/921 |
| 6,299,378 B1 | * | 10/2001 | Griffith .............. F16B 15/0046 411/467 |
| 2017/0073972 A1 | * | 3/2017 | Gilbert .................. E04B 1/2608 |

* cited by examiner

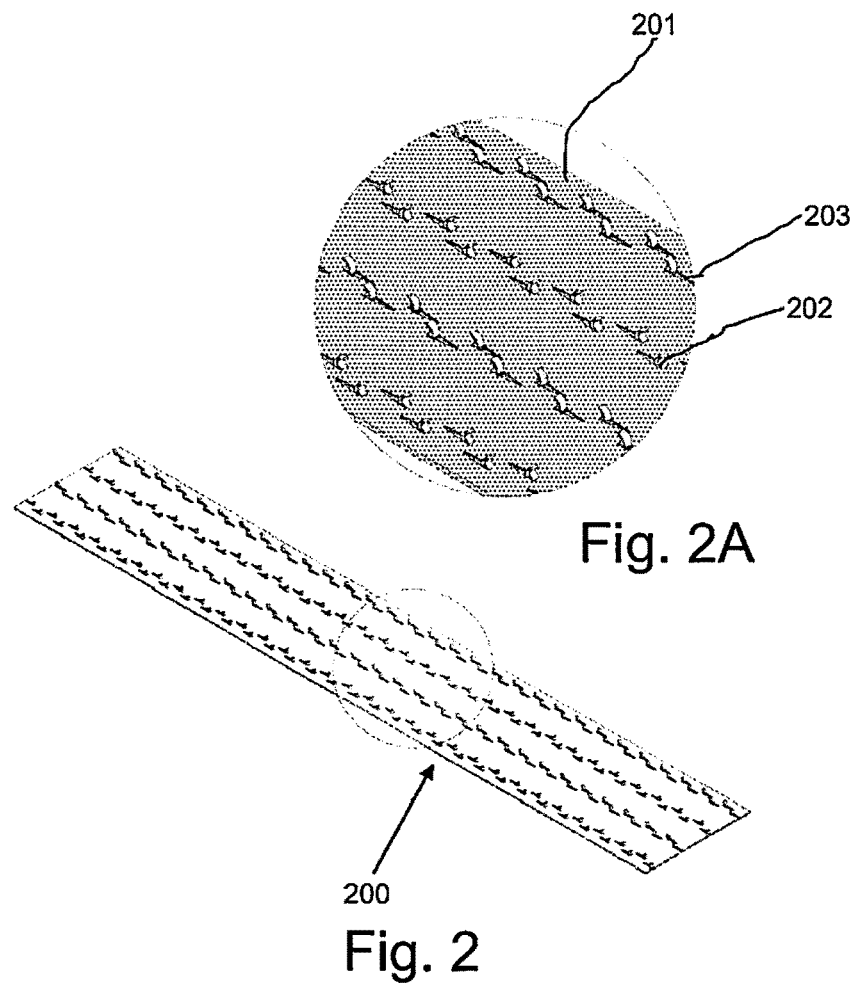
Fig. 2A
Fig. 2
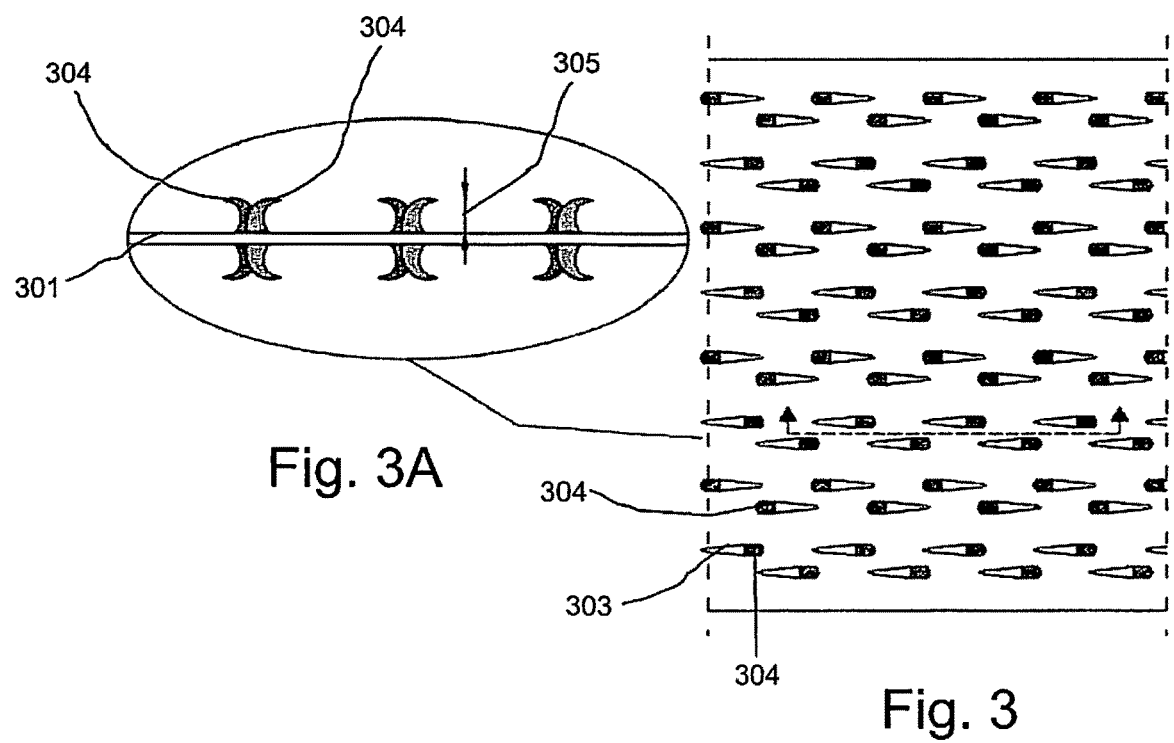
Fig. 3A
Fig. 3

METHOD FOR CONNECTING WOODEN CONSTRUCTION PANELS WITH AN INSULATING MATERIAL LAYER

BACKGROUND OF THE INVENTION

The present invention describes a method for connecting timber construction panels to an insulating material layer, in particular a soundproofing and/or thermal insulation layer, by means of a connecting plate or strips, according to the preamble of the claims.

STATE OF THE ART

From U.S. Pat. No. 3,347,126 a plate for timber construction panels is known, which consists of a flat metal plate or metal strip with a plurality of pairs of elongate teeth extending substantially perpendicularly to the plate. These teeth are made by drilling a hole in the plate into which they are inserted, bringing the material into a position that is perpendicular to the plate and forming a tip. In the disclosure, this tip is curved substantially perpendicular to the tooth. Advantageously, two opposing teeth have their tips opposite, but laterally offset, and the tip is the most overhanging element of the tooth in the direction parallel to the surface of the plate.

This type of plate presents some problems, in particular it does not allow sealing for two surfaces of the plate or due to the method of making the teeth, the number of teeth is limited and moreover no seal is provided to prevent sliding relative to the wooden panels in relation to the plate and the interlayer of insulating material.

SUMMARY OF THE INVENTION

In the context of the present invention, "significant" is understood to mean deviations of +−5% and/or +−5°.

It is the object of the present invention to carry out a method for joining at least two wooden panels in order to provide both a structural an insulating and connection, e.g. acoustic insulation and/or thermal insulation, wherein in a first step a first metal plate or metal strip (a metal strip is also a metal band) with teeth facing one of the surfaces of the at least one wooden panel is arranged in a direction substantially perpendicular to the surface of the panel, Attaching an insulating element, a thermal and/or acoustic insulation layer on the second surface of the first metal plate or metal strip with teeth, Attaching a second metal plate or strip with teeth on the insulating element, Attaching a third element of a wooden building element on the second surface of the second metal plate or metal strip with teeth, Inserting screws through at least one element and at least one metal plate/strip.

The metal plate or strip comprises a plurality of teeth, these teeth preferably having a curved surface and at least two rows of teeth being arranged with tips pointing in opposite directions, and the metal plate preferably having a thickness of less than 1.5 mm. If the metal plate or strip has a thickness of 1.5 mm or less, it can be pierced with a screw during fastening.

In a preferred embodiment, the entire tooth is oriented behind or at most level with the tooth base, in relation to the point/line where the tooth protrudes from the plate is the tooth base. The normal line to the point of protrusion is aligned with the tip of the tooth or is located behind it.

This shaping of the tooth on the connecting plate is necessary for the method according to the invention. In the method according to the invention, a surface of a wooden panel is prepared in a first step, on which the plate is then placed with the teeth facing the surface of a wooden panel, a panel or the like. In a preferred embodiment, the plate can be attached to the wooden panel by one or more blows, for example with a hammer or a separator, in order not to damage the tooth.

These hammer blows are preferably made substantially perpendicular to the panel to ensure that the panel only moves perpendicular and not horizontal to the wood panel. For this reason, it is necessary that the tooth base is the foremost point of the tooth towards the tip of the tooth to ensure optimal support of the tooth and to avoid the formation of loads on protruding tooth elements. In addition, the curved shape of the tooth allows for a spring effect when the tooth is loaded substantially vertically during insertion into the wood panel.

After laying the panel in one embodiment of the method according to the invention, a layer of insulating material is applied to the second side of the panel and a second metal plate or metal strip is then applied to this insulating layer, with the first surface facing the material layer and attached to it, for example by a few hammer blows or by a press after the joints have been made, and then on the second face a second wooden panel is fitted with a row of teeth on the second face of the panel. After the second wood panel is laid, screws are inserted to pierce the panel. The metal plate or metal strip, preferably made of steel and/or aluminium, has a thickness of 1.5 mm or less. These screws must be installed essentially perpendicular to the plate. In this way, the two wooden panels are clamped under pressure against the plate, causing the teeth to penetrate the respective wooden panels. When tightening the screw, pressure is applied to the plate and the teeth penetrate the two wooden panels.

The screw that pierces the metal plate is preferably used so that the entire thread penetrates the plate according to the invention.

Then screws are passed through the connecting plates to ensure a compressive force between each layer.

This type of connection enables a high and surprising static tightness of the connection produced in this way. Because the teeth are oriented in at least two opposite directions, they block the parallel movement of the wood panels relative to the plate.

DESCRIPTION OF THE DRAWINGS

Further characteristics and details of the invention emerge from the claims and from the following description of a preferred, non-restrictive embodiment which is illustrated in the accompanying drawings, wherein:

FIG. 1 shows a view of a plate with teeth in a first embodiment.

FIG. 2 consists of FIG. 2 and FIG. 2A and FIG. 1 is a view of a plate with teeth in a second embodiment, and FIG. 2A shows an enlargement of FIG. 2;

FIG. 3 consists of FIG. 3 and FIG. 3A and FIG. 3 shows a view of a plate with teeth in a third embodiment, and FIG. 3A is a section of FIG. 3.

DETAILED DESCRIPTION OF THE INVENTION

Figures 1, 1A:
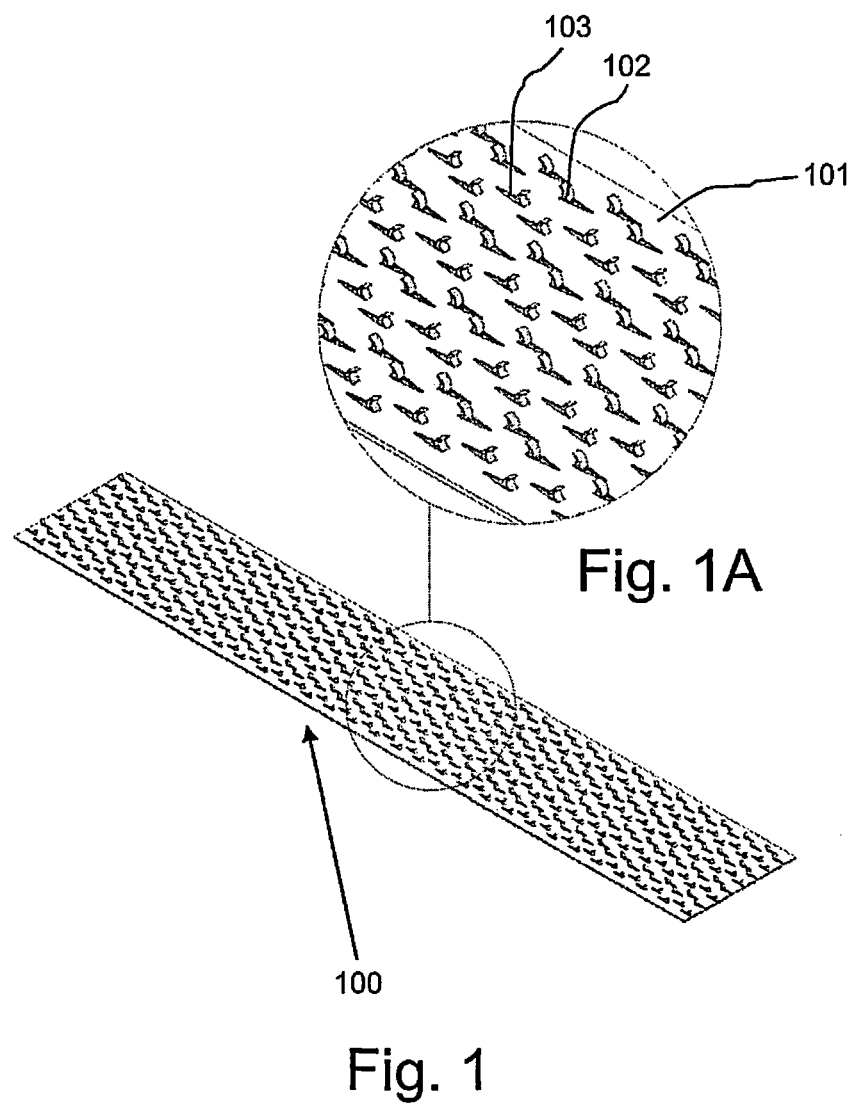
FIG. 1 consists of FIG. 1 and FIG. 1A
FIG. 1A shows an enlargement of FIG. 1.

FIG. 1 shows a metal plate or strip according to the invention 100. The metal plate or the metal strip 100 is preferably made of steel and/or aluminium. This plate/strip 100 has a thickness 101 of less than 1.5 mm and therefore does not require holes for the connecting screws 500, since these screws can break through the plate 100 at any point. FIG. 1A shows an enlargement of FIG. 1. In this figure teeth 102 can be seen which have been formed by the displacement of metal material from plate 100, particularly by displacement of material from region 103, to form the tooth 102. This processing preferably does not require drilling of the plate 100. In FIG. 1, the metal plate 100 has a plurality of rows of teeth 102 with the direction of the tooth tip alternating in the adjacent rows of teeth 102.

FIG. 2 shows a second metal plate or strip 200 in a second embodiment. The metal plate or metal strip 200 consists of a metal surface 201 on which are arranged a series of teeth 202 which are formed by deforming the metal material in the area of the deformation zone 203,303 of the metal plate 201, 301 without breaking it. In FIG. 3, the teeth are arranged in double rows with the tips pointing in the same direction, and then a second double row with the tips of the teeth pointing in the opposite direction.

In FIG. 2, when the teeth 202 are inserted into, for example, a wooden beam or the like, the teeth 202 face each other and the tips of the teeth provide a grip in both directions.

The teeth are always arranged on both sides of the plate surface.

Figure 4:
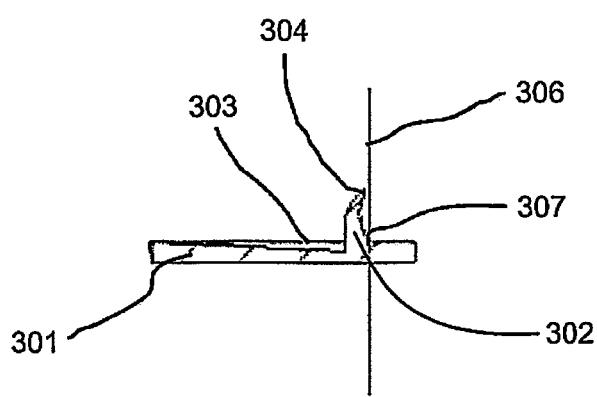
FIG. 4 is a section through a tooth on the plate, and FIG. 5 consists of FIGS. 5A-5F which show individual process steps in a second process according to the invention.

FIG. 3 shows a view of a metal plate or strip formed by a surface 301, and FIG. 3A shows an enlarged portion of FIG. 3. The surface 301 and the teeth 302 can be seen in this portion. These teeth have a height 305 and a tip 304. The tips 304 are located opposite each other between two aligned rows of teeth 302. In this way, the tooth tips engage in opposite directions. FIG. 4 shows a single tooth 302. This single tooth has been made by displacement of material from region 303 and is thus shaped so that tooth connection plate overlap 307 protrudes from surface 301 as viewed from the line perpendicular to tooth base and preferably in front of tip 304 of tooth 302 or at most aligned. The tooth 302 has a substantially curved, i.e. concave, shape.

This ensures that the tip of the tooth 302 is not the most forward part of the tooth in the direction of the tip, but is at most aligned with the tooth connection plate overlap 307 protruding from the surface 301. This is particularly advantageous since the tooth is inserted substantially perpendicularly, i.e. in a direction perpendicular to the plate 300, into the material, for example wood. If the tip 304 of the tooth 302 were the most forward element toward the tip of tooth 304, there would be portion of the tip relative to tooth attachment 307 that could result in fracture of tip 304 of the tooth.

In addition, the tooth could be bent against the direction of the tip during insertion into the wooden panel and thus, due to the curved shape of the tooth, generate an elastic load and therefore a pressure against the wooden panel into which it is inserted, ensuring better penetration of the tooth.

Figure 5A:
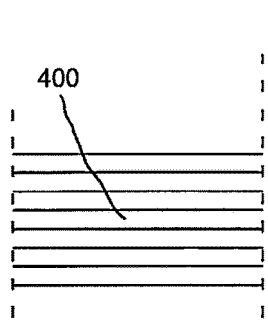
Figure 5B:
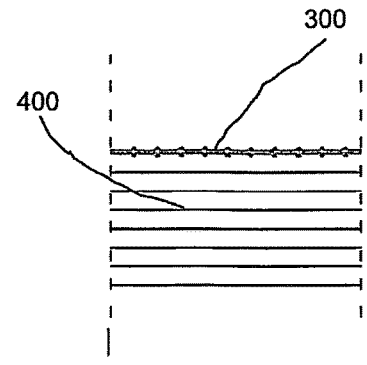
Figure 5C:
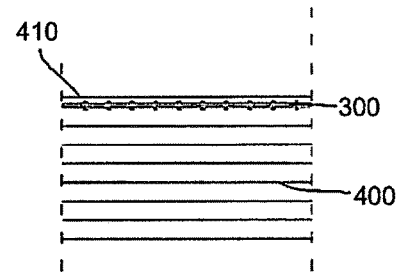

FIG. 5A shows a wooden panel 400 to which a plate/strip 300 according to the invention is attached in FIG. 5B. Advantageously, this plate 300 is pressed against the wooden panel. In a third step, shown in FIG. 5C, a layer of another material is applied to the second surface of the plate 300, a layer of insulating material 410. Due to the surface structure of the plate 300 with the teeth 302, the insulating material can be attached directly to the plate by pressure only, so that no further fastening elements such as glue and/or the like are required.

Figure 5D:
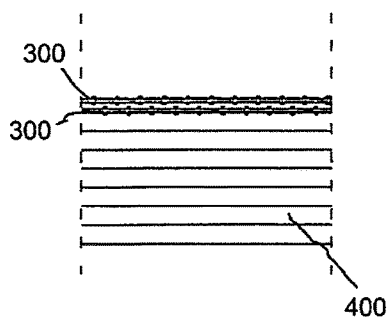
Figure 5E:
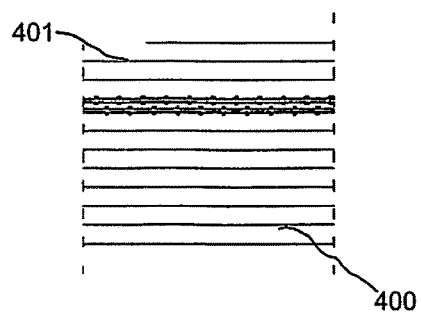
Figure 5F:
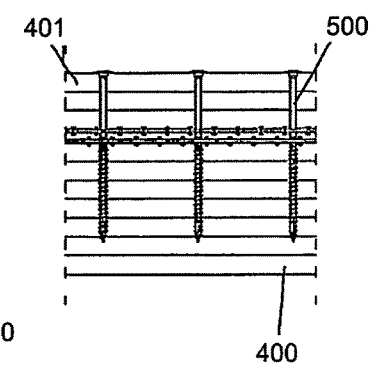

In a fourth step shown in FIG. 5D, a second metal plate/strip 300 according to the invention is placed on the other surface of the insulating material layer. In a fifth step, shown in FIG. 5E, a wooden panel 401 is placed on the second surface of the second metal plate 300 or the second metal strip according to the invention. In a sixth step, which is shown in FIG. 5F, screws 500 passing through the plates 300 are introduced, in particular in such a way that the entire thread of the screw 500 passes through the metal plates 300 according to the invention.

In particular, the connections made by the method according to the invention allow both structural stability and, at the same time, acoustic insulation, for example. This connection therefore makes it possible to insulate while ensuring a static connection between the individual elements. The method according to the invention can also be used to produce semi-finished products, which are then assembled on site.

The method according to the invention is advantageously used for T- or L-shaped connections in which the screws go through the width/thickness of one of the wooden panels.

In a preferred embodiment, the height of the teeth of the metal plates 100, 200, 300 varies between 10% and 50% of the thickness of the insulating layer, advantageously the thickness of the insulating material is less than 3 cm, preferably less than 13 mm.

The height of the teeth is advantageously between 0.5 mm and 15 mm, preferably 1-3 mm.

Finally, it is clear that additions, modifications or variants to the method and the connection plate described here can be applied, which are obvious to a person skilled in the art, without going beyond the scope of protection afforded by the appended claims.

REFERENCE NUMBERS

100 Metal plate or metal strip
101 Surface of a metal plate or metal strip
102 Tooth
103 Deformation zone
200 Metal plates or strips
201 Surface of a metal plate or metal strip
202 Tooth
203 Deformation zone
300 Metal plates or strips
301 Surface of a metal plate or metal strip
302 Tooth
303 Deformation zone
304 Tooth tip
305 Tooth height
306 Normal line Tooth connection Tooth projection Plate projection
307 Tooth connection Plate overlap
400 Wooden panel
401 Wooden panel
410 Insulating element/insulating layer
500 Screws

The invention claimed is:

1. A method for connecting at least two wooden panels for acoustic and/or thermal insulation, comprising in a first step a metal plate or a metal strip with a thickness equal to or less than 1.5 mm with teeth, which teeth face a first surface of a first wooden panel is attached in a direction perpendicular to a first surface of the metal plate or the metal strip, an insulating element is attached on its first surface to a second surface of the metal plate or the metal strip by teeth, a second metal plate or metal strip with a thickness of 1.5 mm or less is attached to a second surface of the insulating element, a second wooden panel is attached on a second surface of the second metal plate or strip by teeth, the first and second wood panels, screws are inserted through the first and second metal plate or metal strips and the insulating element wherein the height of the teeth of the metal plates or strips varies between 10% and 50% of the thickness of the insulating layer and the thickness of the insulating material is less than 3 cm.

2. The method for connecting at least two wooden panels according to claim 1, wherein the connection between the wooden panels is a T- or L-shaped connection.

3. The method for connecting at least two wooden panels according to claim 1, wherein a threaded part of the screws is completely into the wooden panels.

4. The method of connecting at least two wooden panels according to claim 1, wherein a second insulating element is attached between the first wooden panel and to a third wooden panel and is made of a sound-absorbing and/or heat-insulating polymeric material.

5. The method of connecting at least two wooden panels according to claim 1, wherein the screws are inserted substantially perpendicular with respect to the wooden panels.

6. The method for connecting at least two wooden panels according to claim 1, wherein the screws entire thread is inserted through the metal plates or metal strips as well as into the second wooden panel.

7. The method of connecting at least two wooden panels according to claim 1, wherein when inserting the screws, the screws are inserted on opposite sides of the wooden panels by screwing through at least one panel at a time.

8. The method of connecting at least two wood panels according to claim 1, wherein the thickness of the insulating material is less than 13 mm.

* * * * *